JOHN COOMBE.
Improvement in Animal Traps.

No. 123,381. Patented Feb. 6, 1872.

Witnesses
J. L. Boone
W. F. Bingham.

Inventor
John Coombe
by Dewey &
his Attorneys 123,381

UNITED STATES PATENT OFFICE.

JOHN COOMBE, OF SAN JOSÉ, CALIFORNIA, ASSIGNOR TO HIMSELF AND HENRY PHELPS, OF SAME PLACE.

IMPROVEMENT IN ANIMAL-TRAPS.

Specification forming part of Letters Patent No. 123,381, dated February 6, 1872.

SPECIFICATION.
*To all whom it may concern:*

Be it known that I, JOHN COOMBE, of San José, county of Santa Clara, State of California, have invented an Improved Animal-Trap; and I do hereby declare the following description and accompanying drawing are sufficient to enable any person skilled in the art or science to which it most nearly appertains to make and use my said invention without further invention or experiment.

My invention relates to that class of animal-traps in which a wheel or shaft with radiating wings or platforms, which revolve inside of a box, is used; and my improvements consist in so mounting the wheel or shaft, with its platforms, that it can be revolved by a spring when the animal to be trapped is small, or, by moving some of the parts so as to throw them out of gear, leave the wheel to be revolved by the weight of the animal. My invention also relates to some of the minor details of the machine.

In order to explain my invention so that others will understand its construction and operation, reference is had to the accompanying drawing forming a part of this specification, in which—

Figure 1:
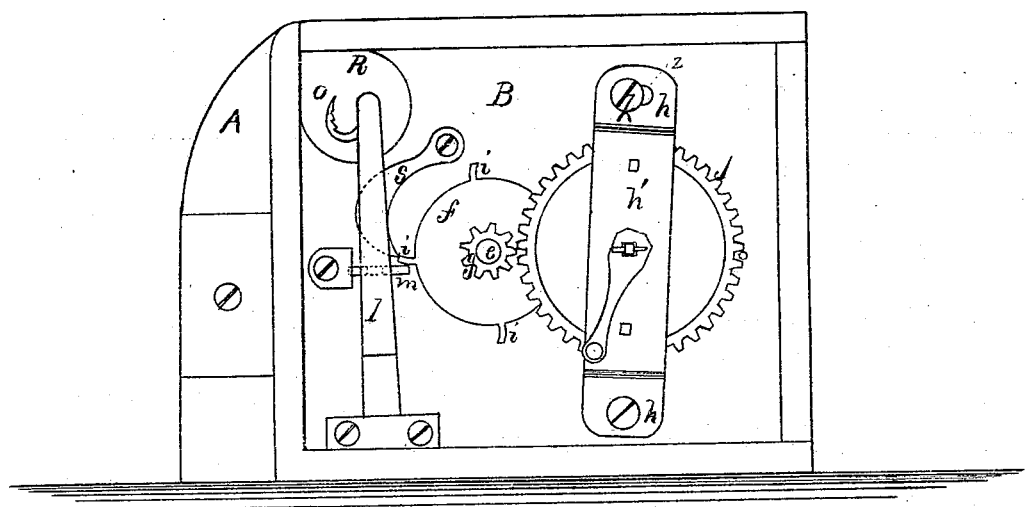
Figure 2:
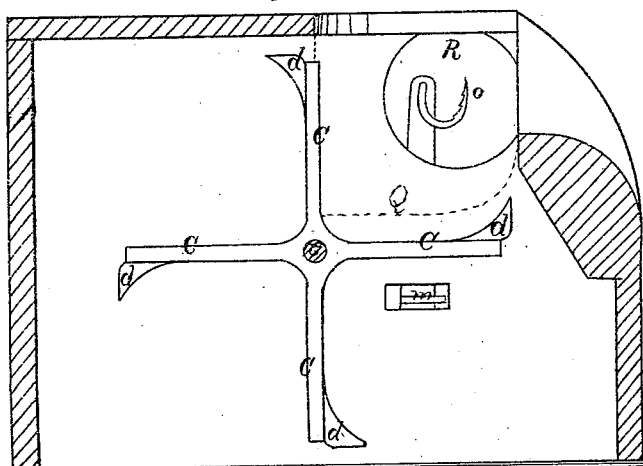
Figure 3:
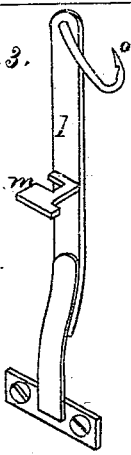

Figure 1 is a side elevation, showing the small compartment in my trap. Fig. 2 is a vertical section, showing the interior. Fig. 3 is a view of the spring-plate.

A represents a box, having a narrow compartment, B, at one side. The shaft $e$ extends through the main compartment of the box, and carries the radiating wings or platforms C. Along the outer edge of each of the platforms C is an angular strip, $d$, which serves for the purpose hereinafter mentioned. The shaft $e$ passes through the side of the main compartment into the narrow side compartment B, where a circular plate, $f$, and pinion, $g$, are secured to it. A frame consisting of two plates $h\ h'$, which are united together at each end, has its lower end secured by a screw or bolt to the side of the compartment B. Between the plates $h\ h'$ is a large toothed wheel, $j$, with a coiled spring, which can be wound up by a small crank. The upper end of the plate $h$ of the frame has a horizontal slot in it, and a set-screw, $k$, passes through the slot into the side of the compartment, by means of which the upper end is secured. By loosening the set-screw, the upper end of the frame can be moved back and forth, so as to throw the toothed wheel $j$ in or out of gear with the pinion $g$, as desired. The circular plate $f$ has as many projections $i$ as there are platforms on the wheel. A spring-plate, $l$, is secured to the side of the compartment near the bottom, and extends upward, curving outward as it rises. Opposite the center of the circular plate $f$, a short rack-plate, $m$, is secured to the spring-bar $l$, so as to pass through the side of the compartment near enough to allow the teeth $i$ to catch upon the projections upon the plate $m$. A very slight movement of the spring-bar $l$ in either direction will free the teeth $i$ so as to allow the pinion $g$, plate $f$, and shaft $e$ with its platforms, to make a quarter revolution, or until the next tooth $i$ strikes the rack-plate $m$. The bait-hook $o$ is secured to the upper end of the spring-bar $l$, and a hole, R, is cut through the side of the compartment B opposite the horizontal platform, which forms the bottom of the passage-way Q, so that the animal, when standing upon the platform, operates the device, which drops him into the box beneath. In order to prevent the wheel from rebounding when the spring is not used, a pawl, S, is suspended so as to be thrown out by the teeth as they descend, and lock them as soon as they strike the rack-bar.

The apron at the outer edge of the platforms prevents the animal from falling from the platform before it has descended far enough to reset the trap.

By this means I provide a trap which can be used for large and small animals, and one which is easily regulated and kept in order.

Having thus described my invention, what I claim, and desire to secure by Letters Patent, is—

1. The wings or platforms C, when provided with the angular strip or apron $d$, substantially as and for the purpose above described.

2. The shaft $e$, with its circular plate $f$, having projections $i$ and pinion $g$, in combination with the spring-bar $l$, rack-plate $m$, and pawl S, substantially as and for the purpose above described.

3. The frame, consisting of the plates $h\ h'$, with the toothed wheel $j$, secured, as described, at its lower end, and made adjustable by means of the slot Z and set-screw $k$, substantially as and for the purpose above described.

In witness whereof I have hereunto set my hand and seal this fourth day of November, one thousand eight hundred and seventy-one.

JOHN COOMBE. [L. S.]

Witnesses:
W. F. BINGHAM,
J. L. BOONE.